Aug. 15, 1950  P. S. GAY  2,518,769
PLURAL-SPEED FRICTION DRIVE MECHANISM
Filed June 18, 1949  6 Sheets-Sheet 1

Paul Stead Gay,
INVENTOR.
By Dough & Slough
His Attorneys

Aug. 15, 1950 P. S. GAY 2,518,769
PLURAL-SPEED FRICTION DRIVE MECHANISM
Filed June 18, 1949 6 Sheets-Sheet 2

Paul Stead Gay, INVENTOR.
BY Slough & Slough
His Attorneys

Aug. 15, 1950     P. S. GAY     2,518,769
PLURAL-SPEED FRICTION DRIVE MECHANISM
Filed June 18, 1949     6 Sheets-Sheet 5

Paul Stead Gay, INVENTOR.
BY Slough & Slough
His Attorneys

Aug. 15, 1950     P. S. GAY     2,518,769
PLURAL-SPEED FRICTION DRIVE MECHANISM Filed June 18, 1949     6 Sheets-Sheet 6

Paul Stead Gay, INVENTOR.
BY Slough & Slough
His Attorneys

Patented Aug. 15, 1950

2,518,769

UNITED STATES PATENT OFFICE 2,518,769

PLURAL-SPEED FRICTION DRIVE MECHANISM

Paul Stead Gay, Elyria, Ohio, assignor to The General Industries Company, Elyria, Ohio, a corporation of Ohio Continuation of application Serial No. 83,665, March 26, 1949. This application June 18, 1949, Serial No. 99,914

20 Claims. (Cl. 74—199)

My invention relates to a plural speed friction drive mechanism adapted to be applied to drive phonograph turntables at any of a plurality of selected speeds.

My invention relates more particularly to a plural speed mechanism adapted to be so interfitted with a support for a rotatable turntable having a pendant annular flange that a final drive wheel of the mechanism may peripherally frictionally engage a lateral surface of said flange to drive the turntable, and wherein any of a plurality, such as three, of idler pulleys are successively adapted for selective adjustment movement to an operative position, which is located between laterally adjacent portions of peripheral surfaces of a motor driven pulley and a laterally movable wheel of preferably greater diameter than any operative portion of the aforesaid pulleys, and said pulleys being each provided with upper and lower pulley portions, one of said portions being disposed at the level of said driving pulley, and the other being disposed at the level of the peripheral rim of said wheel, and the relative diameters of at least one portion of each said idler pulley being relatively different, as between different of said idler pulleys, so that said pulleys, when driven by said drive pulley, may drive said idler wheel at relatively different speeds.

My invention relates also to improved means including indexing means and spring means for yieldably maintaining any said selectively adjusted idler pulley in an efficient driven relation to said motor pulley and in efficient driving relation to said wheel, and whereby said wheel is exposed to a resilient effort exerted by an element of said spring means to yieldably maintain said wheel in peripheral engagement with a relatively driving portion of said selected idler pulley, and concurrently, when said mechanism is disposed in operative relation to an annular flange of a rotatable turntable, to also yieldably maintain said wheel in spring-pressed peripheral frictional driving engagement with a lateral surface of said flange.

With respect to the improved means herein disclosed for selectively driving the idler wheel at plural speeds, my invention in some aspects, represents an improvement over mechanism disclosed in the pending application for patent of Frank M. Slough, Serial No. 54,246 filed October 13, 1948, being distinguished therefrom in the facility with which three or more turntable speeds are readily achieved, and in the simple arrangement of inexpensive operative parts which permit efficient operation under unfavorable conditions of eccentricity of the driven turntable surface and of the turntable driving wheel of the mechanism.

Objects of my invention include the following:

To provide an improved plural speed friction drive mechanism adapted to effect rotation of an idler wheel, at a selected one of a plurality of speeds, said wheel being adapted for disposition in horizontal alignment with, and whose rim is adapted for frictional driving engagement with, an annular element of a turntable such as a pendant peripheral flange thereof, whereby said idler wheel and the turntable may be selectively driven at any of a plurality of different rotational speeds.

To achieve the driving of such an idler wheel at a plurality of speeds in an improved manner including the selective positioning of a selected one of three or more idler friction pulleys, each having correspondingly upper pulley portions of relatively different diameters, between said idler wheel and a driving pulley, the latter being driven by an electric motor in any suitable way, and preferably by making said driving pulley an element of the motor shaft, and wherein a lower portion of any said selectively positioned idler pulley is yieldably resiliently maintained in peripheral engagement with said driving pulley, and said idler wheel is independently yieldably resiliently maintained in peripheral engagement with an upper portion of the same said selected idler pulley.

To achieve, in an improved manner, the interpositioning of any one of any desired plurality of friction pulleys between a relatively smaller motor driven pulley, and the relatively larger idler wheel, said pulleys having upper portions which are of relatively different diametrical sizes, whereby the idler wheel which is adapted for peripheral engagement with an annular surface of a phonograph turntable to drive the same, may be driven at different speeds each of which is closely commensurable with the diameter of the concurrently selected and operating one of said pulleys.

To achieve any of the foregoing objects in an improved mechanism wherein the idler wheel is resilienty constrained toward peripheral engagement with the driving surface of a selected one of said pulleys, and wherein the selected pulley is resiliently constrained in peripheral engagement with the relatively stationary motor-driven primary driving pulley, whereby eccentric or irregular rotative movements of any peripheral portion of any of said pulleys or of said wheel, and also any such departures from true annularity of a driven turntable flange, or eccentric movement of any portion thereof, are efficiently compensated for, as a result of automatic floating, yieldably restrained, movements of the selected idler pulley or of said wheel.

To achieve any or all of the foregoing objects in a mechanism whereby through utilization of a plurality of idler pulleys preferably equal in number to the number of desired speeds of a turntable to be driven, each pulley having a pair of relatively superposed pulley portions, and wherein one set of portions disposed at the same level may, through calculated differences in their diameters be effective to achieve selective driving of the final drive wheel of the mechanism at desired different rotative speeds.

To provide an improved plural-speed drive mechanism adapted for application to a phonograph turntable flange, comprising a plurality of sequentially disposed frictionally peripherally engaged pairs of pulley elements of which one of the elements of each pair is provided with a friction rim of rubber or like friction, slightly compressible, non-sound conduction material, to prevent motor or other noises involved in the driving of the mechanism, from reaching the turntable so that the reproduction of records disposed upon said turntable may not be adversely affected by transmission of an appreciable portion of said noises to any such record.

To provide an improved drive mechanism for phonograph turntables whereby any or all of the foregoing objects may be achieved and which may be unitarily removably secured to a platform which rotatably supports a phonograph turntable either as original or replacement driving means for such turntable.

To provide an improved drive mechanism for phonograph turntables whereby any or all of the foregoing objects may be achieved and which comprises a speed selecting handle which is adapted for movement in a path which is of uniform directional nature throughout to a plurality of adjustment positions which are interspaced in said path.

To provide an improved drive mechanism for phonograph turntables whereby any or all of the foregoing objects may be achieved wherein the degree of pressure exerted between the peripheral pulley portions of serially related pairs of friction driving elements of the mechanism of which one thereof is the final drive friction wheel of the mechanism, is initially determined by the force exerted by yieldable spring means of the mechanism and wherein during the driving of said turntable by said wheel the degree of such pressure engagement is variably increased according to the load imposed upon said wheel by the driven turntable.

To provide an improved drive mechanism for phonograph turntables whereby any or all of the foregoing objects may be achieved wherein the degree of pressure exerted between the peripheral pulley portions of serially related pairs of friction driving elements of the mechanism of which one thereof is the final drive friction wheel of the mechanism which is initially determined by the force exerted by yieldable spring means of the mechanism.

Other objects of my invention and the invention itself will be apparent to those skilled in the art to which my invention appertains from the disclosures of this application and as set forth in the specification hereof and illustrated in the drawings of said specification, and in said drawings.

Figure 1:
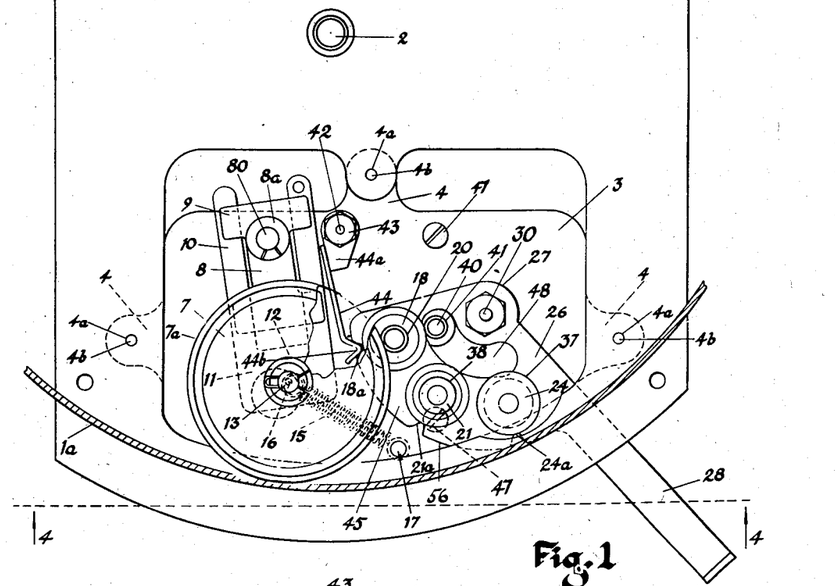
Fig. 1 illustrates in top plan view an embodiment of my invention shown as applied to the driving of a phonograph turntable, a pendant peripheral flange portion thereof being alone shown in horizontal section and with a portion of the idler wheel indicated as broken away to expose details of parts disposed therebelow.
Figure 2:
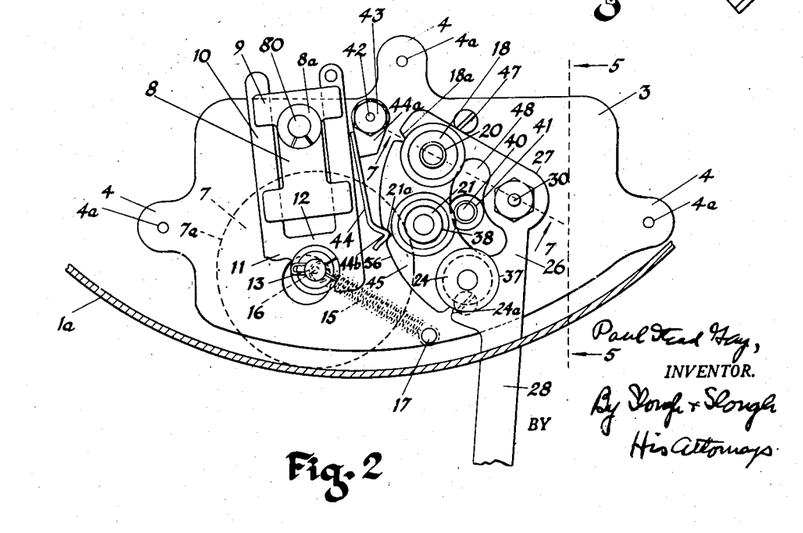
Fig. 2 is a view similar to that of Fig. 1, but wherein a showing of the idler wheel is omitted and its position indicated by a dotted line circle, and the apparatus being shown in a different selective position of adjustment.
Figure 3:
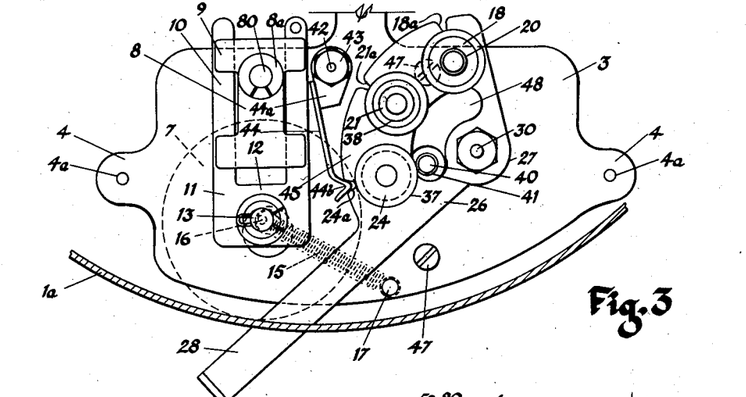
Fig. 3 is a view similar to the foregoing figures, the idler wheel showing being also omitted and the apparatus being shown in a third adjustment position.
Figure 4:
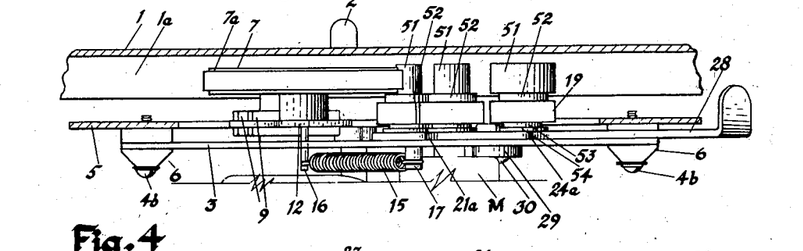
Fig. 4 is a vertical sectional view as from the line 4—4 of Fig. 1, the showing of the turntable being limited to a fragment of the turntable top and pendant flange which is respectively disposed above and beyond the illustrated apparatus.
Figure 5:
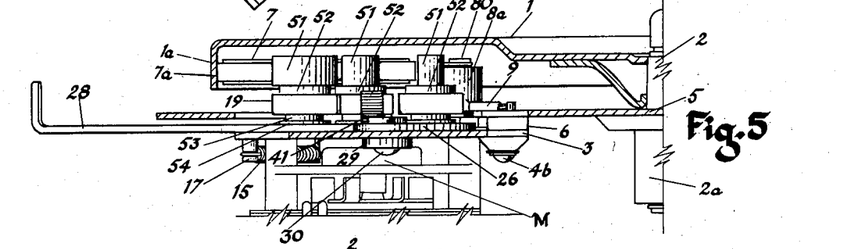
Fig. 5 is a view taken from the line 5—5 of Fig. 2, the showing of the turntable being in vertical cross-section.

Referring now first to the first embodiment of my invention shown in Figs. 1 to 7 inclusive, and in all of which like parts are designated by like reference characters, a typical turntable 1 having a peripheral pendant flange 1a is shown mounted in a known manner to rotate about the vertical axis of a turntable post 2, Figs. 1, 4 and 5, said post being commonly journalled to rotate in bearings 2a which are carried on such a support as the illustrated main plate 5.

The apparatus of my invention is shown in operative relation to such main plate and turntable, and the elements thereof are all unitarily supported on a frame in the form of a plate 3 having three laterally extending lugs 4, Figs. 2, 3 and 4, apertured as at 4a, whereby the plate 3 may be pendantly and removably attached by screws 4b to any such main plate as that shown at 5, direct metal to metal contact between the plates 3 and 5 and between the screws 4b and the plate 3 being prevented by interposing rubber grommet insulating means 6 between said plates and screws in a known manner.

As stated in the preamble hereto, a phonograph turntable flange, such as that shown at 1a, is adapted to be driven by the final drive wheel 7 of the unitary mechanism, at three different rotational speeds as a result of driving the idler wheel 7 at different peripheral speeds which respectively correspond to the three peripheral speeds of the turntable.

The supporting plate 3 is adapted to be so positioned, relatively to the rotatable turntable, that the wheel 7 is preferably disposed at the proper level, and in such a lateral position, as to permit the rubber rim or tread 7a of the idler wheel to preferably peripherally frictionally engage the inner annular surface of the pendant turntable flange 1a, as shown in Fig. 5, reference being also had more particularly to Fig. 1.

The idler wheel is suitably slidably mounted on a carrier 8 which is mounted on a plate 3 in a known manner so as to permit the wheel 7 to move laterally, within limits, in any desired direction, and as an example of known appropriate means to accomplish such a mounting, I have herein illustrated the means which comprises a carrier element 8, said carrier having two pairs of laterally and oppositely extending wings 9, each of said wings being formed with a laterally open guide slot, said slots affording slideways for the two arms 10, of a bifurcated slide member 11, upon the web portion 12 of which, an upstanding journal post 13 is provided, the idler wheel 7 being journalled upon said post.

The carrier element 8, in the exemplary idler wheel mounting, is provided with a hub 8a as journalled on an upstanding post 80 whose lower end is secured to the supplemental plate 3, and said carrier with the slide and wheel is thereby adapted to be laterally swung about the axis of said post 80. Other known means for permitting universal lateral movement of the idler wheel post may be substituted for that shown and described.

A retractile spring 15 is secured at one end to a downward extension 16 of the idler wheel post 13 and at the other end to a pin 17 which is rigidly affixed by riveting to the plate 3, said spring 15 being directed laterally and angularly with respect to the wheel journal post 13, tends to swing the wheel 7 about the post 80, and to slide the wheel, with its supporting slide 11, laterally outwardly from the carrier 8, in the longitudinal direction thereof.

Figure 7:
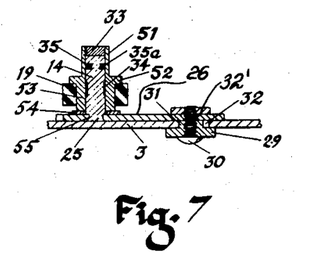
Fig. 7 is a section taken on the line 7—7 of Fig. 2.

The mechanism of my invention is characterized by the provision of an idler pulley carrier in the form of a lever plate 26, which functions as a turret, and which carries three idler pulleys 18, 21 and 24 at the uppermost side of an arcuate portion of the said turret plate, said plate being journalled to swing about a slightly shiftable axis which corresponds to the longitudinal axis of a screw 30, Fig. 7, which is employed to secure the turretlike plate 26 in superposed relation to the mounting plate 3.

The frame plate 3 is provided with an elongated aperture 32, having substantially straight side edge portions, whose major dimension extends in a horizontal direction which is substantially aligned with the axes of the motor shaft 40, and of the idler wheel post 13.

A washer 29, having a lowermost radial flange, also has an upwardly extending tubular flange 31, of such less diameter that it may project upwardly from below the plate 3 through the elongated aperture 32, into engagement with the under surface of the turret plate 26, and is secured to said plate by the screw 30 whose head engages the lower surface of the washer and which is screw-threaded into the threaded aperture 32' of the plate 26.

The above means for securing the plate 26 to the underlying mounting plate 3 permits the plate to be swung about the axis of said screw 30 and at the same time permits a small amount of lateral shifting movement of the turret plate in such a direction as to move said screw 30 and its washer 29 a slight distance toward and from the axis of the motor shaft 40, for a purpose later set forth.

The pulleys 18, 21 and 24, each have an upper and a lower pulley portion, all pulleys being preferably of similar construction and preferably only differing in the variable diameters of the upper portions of said pulleys, it being preferred, however, that in the present embodiment the lower pulley portions of all of said idler pulleys 18, 21 and 24 shall be of the same diameter.

In the embodiment illustrated, the idler pulleys 18, 21 and 24 are each independently journalled for rotation upon a different one of three posts, such as that shown at 14, Fig. 7. Each of said posts 14 has its lower end 25 rigidly riveted to the swingable turret plate 26, and is preferably provided with a medial anular groove 34 and another anular but narrower groove 35 near its upper end portion; a split wire ring 35a is fitted within the groove 35 to prevent longitudinal displacing movement of a pulley upon its post.

Each pulley comprises a metallic tubular body 51 preferably having a radial flange at 52, said flange substantially in the form of that shown in Fig. 7, being similar with respect to all pulleys, although the upper pulley portions 20 and 38 of pulleys 18 and 21 are of lesser diameter than said flange, and the upper pulley portion 37 for the pulley 24 is of greater diameter than the flange portion 52, and therefore in the case of the pulley 24 the portions 52 and 37 might be said to be in the nature of a stepped flange, the uppermost step 37 of largest diameter functioning as the upper pulley portion of the pulley 24.

In the case of each of the pulley bodies 51, the upper end of the bore of each said body is closed against passage and loss of lubricant by the provision of a sealing plug 33 of solder or other suitable lubricant sealing material, and the upper end of the post 14 is adapted to engage the under side of said plug 33. The annular grooves 34 and 35 of the post 14 are adapted to contain lubricant, which is prevented from passing outwardly in the direction through the upper end of the body by the plug 33.

Each of the pulleys is provided with an underlying felt or similar lubricant absorbing washer 54 interposed below the lower end of each pulley body and the upper surface of the turret plate 26. Frictional engagement between each split ring 35a and the lateral wall of the axial bore of the associated pulley body 51, restrains each said pulley from being upwardly displaced while in use, although permitting manually effected removal.

Each of the pulley bodies in the portions 52 and 53 are preferably substantially alike and upon the tubular portion 53 a rubber or equivalent annular pulley element 19 is mounted being tightly telescoped thereover and each of said pulleys preferably employs such pulley elements 19 of preferably the same size, for peripheral engagement with the shaft pulley 41.

The interengaging surfaces of each pair of engaged peripheral surfaces of successive pulley elements, herein, have at least one of said surfaces constructed of rubber or equivalent friction drive material through which vibrational sounds may not be noticeably communicated to the thereby engaged pulley, or turntable flange.

Therefore, the idler wheel 7 is provided with a cushioning rubber peripheral tread 7a for engagement with the metallic surface of the turntable flange 1a, which it is adapted to engage, and for the same reason the driving surfaces of the upper pulley portions 20, 38 and 37 of the idler pulleys 18, 21, and 24, are metallic, but each of the said upper metallic pulley portions are adapted to be selectively engaged with the rubber or similar sound insulating tread 7a of the idler wheel, which affords an efficient frictional engagement with said metallic idler pulley surfaces.

For the same reasons, the treads comprising the annular pulley portions 19 for the lower pulley portion of each of the said idler pulleys, and which are selectively adapted for successive engagement with the metallic motor driven pulley 41, also are made of rubber or like material, shown 19, Fig. 7, for each of said lower pulley portions.

In order to drive the herein disclosed mechanism, an electric motor such as the motor shown at M, Figs. 4 and 5, having an upwardly directed motor shaft 40, is pendantly carried by the supplemental plate 3 being secured to said plate in any suitable way such as by machine screws or bolts 41 and 42, the latter having a co-operative nut 43 disposed above the plate 3 which also serves to clamp a leaf spring element 44, by its flange 44a later to be described in desired operative position.

In order to selectively pre-determine the peripheral speed at which the idler wheel and therefore an idler engaged turntable may be driven, I provide an exceedingly simple, positively operable adjustment turret lever plate 26.

Figure 6:
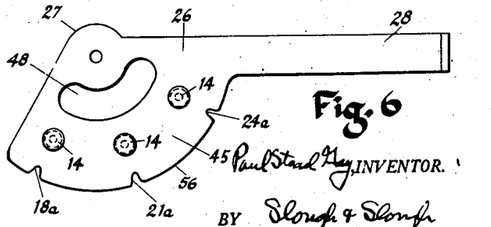
Fig. 6 is a view of a manually adjustable swinging lever having a handle portion which is employed for the purpose of selectively pre-determining the rotational speed of the idler wheel which is adapted to drive the turntable.

Fig. 6 shows in plan view the turret plate lever 26 which is fulcrumed at 27 to function as a control lever having a handle 28. Said plate 26 is apertured at 48, the latter aperture being of preferably elongated arcuate form for the purpose of permitting the motor shaft 40 which at its upper end carries the pulley 41 to be telescoped upwardly therethrough, without interfering with operative swinging movements of said lever plate 26.

The lever 28 affords an arcuate portion 45 having successive apertures corresponding to that shown at 55, Fig. 7, in order to accommodate the lower ends, such as at 25, Fig. 7, of the three journal posts for the pulleys 18, 21 and 24, said ends being preferably riveted in place in said apertures all of which are like that shown at 55, Fig. 7.

The arcuate edge 56 of the lever plate 26 is provided with successive notches at 24a, 21a and 18a, the notches being each located in alignment with said turret-plate aperture 32 and one of the respective apertures 55, and are adapted for the purpose of receiving the hook detent portion 44b of the spring 44, when said lever 26 is swung on its said axis 27 to three different operative adjustment positions, said detent being successively received within the different notches 18a, 21a and 24a, assuming clockwise rotation of the handle 28 of said lever about its said axis 27 from the position indicated for such lever in Fig. 1.

The three pulleys 18, 21 and 24 being disposed in substantially arcuately interspaced relative positions as shown, when the lever handle 28 is swung from the position shown in Fig. 3, to that shown in Fig. 2, and thereafter to the position shown in Fig. 1, it will be noted from these drawings that whereas in Fig. 3, when the lower pulley portion of the idler pulley 24 is initially engaged with the motor pulley 41, and the spring detent 44b is in the notch 24a, and when the plate handle 28 is swung to move the notches 21a and 18a successively to permit said detent to successively enter said notches 21a and 18a, that concurrently the lower pulley portions 19 of the pulleys 21 and 18 are also successively disposed in engagement with said motor pulley 41, since they successively take substantially the identical position with respect to said motor pulley previously assumed by the initially engaged pulley 24.

In this connection it is important to note that when any of the lower pulley portions of said idler pulleys are thus selectively engaged with the motor pulley 41, that the axis of the selectively operative idler pulley and that of the common motor shaft pulley 41, are substantially in alignment with the swinging axis of the turret lever 26.

Also in the three different operative positions of the lever 26, while the rubber rim of the lower pulley portion of any particular selected idler pulley 24 is engaged, as described, with the motor pulley 41, its associated metallic upper pulley portion 37, 38 or 20 is concurrently engaged with the rubber peripheral rim 7a of the idler wheel 7, which engagement is resiliently maintained by the tension spring 15.

Expressed otherwise, the three different illustrated operative positions of the lever handle 28 respectively permit the idler wheel 7 to be frictionally driven by the upper pulley portion of any of the pulleys 24, 21 or 18, whose lower pulley portion at that time is operatively positioned in frictional engagement with the motor pulley 41.

The elongated opening 32 in the plate 3 is provided for the purpose of permitting the lever plate 26 to yieldably move a slight amount in either opposite direction defined by a line passed through the aligned axis 30 of the lever, and the rotative axes of the shaft 40, and any operatively positioned idler pulley.

Such movement in one direction resulting from the pressure of the leaf spring 44 whose detent portion 44b is always in pressure engagement with said lever plate 26 at a point of engagement whose location depends upon the adjustment of the lever.

The degree of pressure engagement between the periphery of the lower pulley portion of a selected idler pulley and the motor pulley 41 may thus be limited to that pressure which is exerted by said spring 44 with the added increment of pressure which is supplied by the peripheral engagement of the idler wheel 7 with the upper portion of the selected pulley, and caused by the relatively light tension spring 15 which maintains the idler wheel in concurrent engagement with the turntable flange 1a and the upper pulley of the selected idler pulley.

The leaf spring 44 normally deflects the turret lever plate 26 in a direction extending from the spring detent 44b towards the axis of the lever plate, and therefore when the plate 26 is swung the successively engaged idler pulley and the plate are deflected in the opposite direction against the pressure of said leaf spring 44. The springs 44 and 15 of which that at 44 is preferably so made as to exert a greater force, constitute two elements of spring means which limit and predetermine the degree of pressure engagement of each of the two superposed portions 51 and 19 of an operatively disposed selected pulley with respectively the idler wheel rim 7a and driving pulley surface 41, and also the pressure of engagement of said wheel rim 7a and the inner annular surface 1a of an associated turntable flange 1.

In every adjustment position the operatively positioned one of said idler pulleys is engaged by its upper portion 51 with a closely corresponding point on the periphery of the wheel rim which, with respect to the wheel axis, is so angularly related to the portion of such periphery which is engageable with a turntable flange that radii of said wheel extended to said point and said portion of the wheel periphery will define an obtuse angle which in the embodiment of Figs. 1 to 6 inclusive is nearly 120° and more than 110°.

The obtuse angle relationship between the pulley driven and turntable driving portions of the wheel rim periphery which are engageable by a driving of one of the idler pulleys is preferred for the reason that when the wheel and turntable are driven in the clockwise direction the wheel tends to recessionally roll upon and travel upon the turntable flange thus causing said wheel to tend to move in a direction towards the space between the engaged portion of the turntable flange and the wheel-engaged pulley portion 51. The wheel diameter is sufficiently greater than the width of such of said space and therefore with only tangible effect of the rolling tendency of the driven wheel 7 is to increase the pressure of peripheral engagement between said wheel and said operatively engaged one of said idler pulleys, which is in position to bar such rolling translatory movement of the wheel under the normal condition of operation when the wheel viewed from above is rotated in the clockwise direction.

By virtue of this inward rolling tendency by the wheel 7, the action of the spring 15 upon said wheel is reinforced and therefore is not required to exert as great a laterally directed effort on said wheel as would be the case if such rolling effect were absent.

It will be understood that in the illustrated preferred embodiment of my invention, I preferably make the lower pulley portions of each of the three idler pulleys of corresponding diameters, whereby by shifting any of said idler pulleys to the driving operative position, the resulting peripheral speed of the idler wheel and therefore the peripheral speed of the driven turntable flange will be substantially in proportion to the diameter of the upper pulley portion of the selected pulley.

Therefore, in the drawings I have shown or have attempted to show the upper pulley portions of the pulleys 18, 21 and 24 of respective diameters which are close to the ratio of 33, 45 and 78 in order to selectively achieve turntable rotational speeds of respectively 33, 45 and 78 R. P. M.

The spring detent 44b is effective to supply a proper amount of pressure to the turret plate 26 to effect proper pressure engagement between the lower pulley portions 19 and the motor drive pulley 41 which may either be afforded by the motor shaft or driven thereby in any suitable way. The pressure of the detent spring 44b is effective to so dispose the plate 26 that the tubular flange of the securing washer 31 will take a position intermediate the end edges of the aperture 32.

Figure 11:
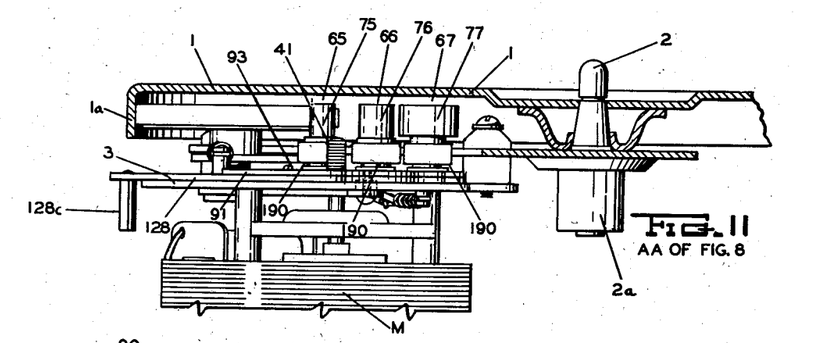
Fig. 11 is a view mostly in side elevation with a portion of the turntable and its supporting plate shown in vertical section and a lower fragmental portion of the motor being shown as broken away, the view being one taken as from the line A—A of Fig. 8.
Figure 12:
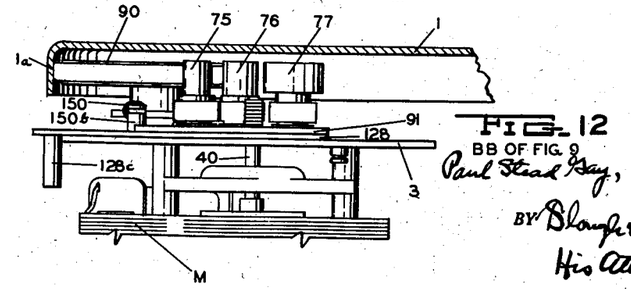
Fig. 12 is a view similar to that of Fig. 11 taken from the line B—B of Fig. 9, and in this view a lesser lateral portion of the turntable is shown.
Figure 13:
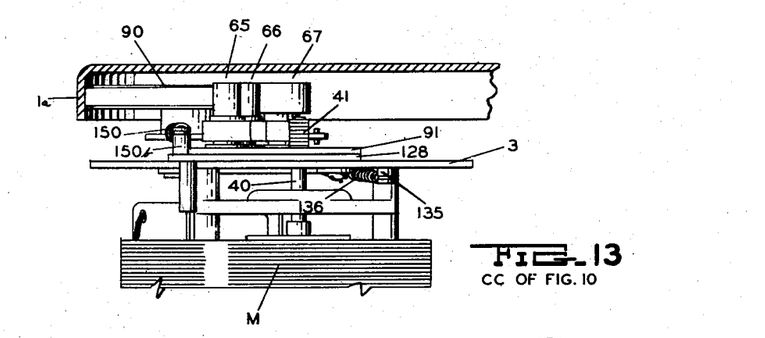
Fig. 13 is a view similar to that of Figs. 11 and 12 being taken from the line C—C of Fig. 10.
Figure 14:
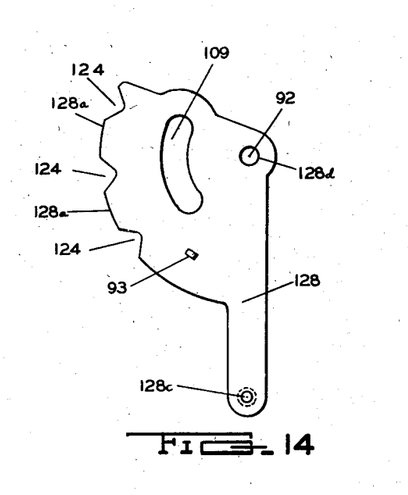
Fig. 14 is a plan view of a manually operable lever having a handle extension.

Referring now to the second embodiment of my invention, as before, the turntable is shown at 1 and its peripheral pendant flange at 1a and the plate supporting all parts of the mechanism being shown at 3, said plate being adapted to be suitably interfitted to the platform or mounting frame 5 upon which the turntable post 2 is journalled, the journal casing being best shown at 2a, Fig. 11.

It will be noted that the idler wheel while being carried upon the web 57 of a bifurcated slide element 63 having a pair of parallel forks 58 and 59, substantially as in the first embodiment that instead of the carrier for said slide being rotatable, in the present embodiment, the forks of the slide are disposed between upper and lower vertically interspaced spool flanges 60 and 61 of a stationary spool-like mount 70, said forks being slidably disposed between opposing surfaces of said flanges and loosely slidably engageable, by their inner edges, with a portion of the spool body disposed between the flanges. Below the lowermost flange 61 of the mount 70, a downwardly projecting base 62 is adapted to be seated upon the upper surface of the frame plate 3 and rigidly secured to said plate by riveting the reduced lower end of said base within an aperture of said plate.

The slide is adapted to be moved inwardly and outwardly in the longitudinal direction of its arms and also is free to swing about the axis of the carrier 70. The slide 63 is limited in its outward movement by the provision of a pin 64 projected through one of the slide arms 59 and projecting above and below said arm, said pin adapted to engage with the peripheral surfaces of the upper and lower spool flanges 60 and 61 upon maximum longitudinal movement of said slide arms between said flanges to restrain said slide to a maximum of longitudinal movement of said arms.

The above described stationary carrier, of the second embodiment, has been found to satisfy all requirements in a very efficient manner and is less expensive to manufacture than the slide carrier of the first described embodiment.

The second embodiment of my invention involves the provision of three idler pulleys 65, 66 and 67 which are mounted on a swingably turret-like plate 91 which corresponds generally to the lever plate 26 of the first embodiment, and similarly, the said three idler pulleys have upper and lower pulley portions of which the lower portions are provided with rubber treads 190, each preferably of the same diameter and upper pulley portions 75, 76 and 77, said upper pulley portions being of different diameters which are proportional to the different peripheral speeds of the final drive wheel 90, which is, like the wheel 7 of the first embodiment, likewise proportional to the resulting rates of rotation of the turntable 1 when the turntable flange 1a is selectively singly engaged by said pulley portions.

In the second embodiment also, the diameters of the pulley portions of said idler pulleys are of somewhat lesser diameters than the corresponding portions of corresponding of said pulleys employed in the said first embodiment. By virtue of the use of pulleys having upper and lower portions of relatively reduced diameters, these can be more compactly arcuately disposed so that, with the axes of the idler pulleys disposed concentrically with the swinging axis 92 of the plate 91, the axes of the laterally outermost pulleys 65 and 67 are angularly separated by an angle of about 60°, whereas the corresponding angle in the said first embodiment is about 90°, even though in both cases the radial distance of said idler pulley axes from said swinging axis 92 happens to be equal.

In the said second embodiment also the handle 128, although loosely interlocked with the turret plate 91 by reason of an upward projection 93 of the handle element 128 extending very loosely within a circular aperture 94 of the turret plate 91, both said turret plate and handle element being swingable about the same axis. The relatively small projection 93 of the handle element 128 is substantially narrower than the diameter of the circular aperture 94 of the turret plate through which it loosely projects and when the handle is manually swung, the handle element 128 will swing about its axis an amount indicated by the relative displacement indicated in Fig. 15 as between the solid line handle edge 128a and the dotted line showing of said edge at 128b.

Therefore, the handle 128 will move the above said indicated distance before the leading edge of the upward projection 93 of said handle element engages the edge of the circular opening 94, whereupon further manually effected movement of said handle 128 will communicate to said turret plate through the instrumentality of said projection 93 a tractive effort causing said turret plate to move with said handle toward a desired position of adjustment of said turret plate.

It will be understood that the lowermost handle lever plate 128 and the relatively uppermost superposed turret plate 91 are swingable on the same vertical axis 92 which corresponds to the axis of a short machine screw 110 which secures the said plates 128 and 91 together at the upper side of the frame plate 3.

Cooperatively associated with the screw 110 is an axially bored element 111 having a lowermost radially extending annular flange 111a and an upstanding stem in the form of a tubular flange 111b, the element 111 having a vertical axial bore 111c which is of slightly greater diameter than the threaded stem of the screw 110, said stem being of somewhat greater length than the vertical extent of the element 111.

The frame-plate 3 is provided with an elongated aperture 3a whose major axis is shorter than the diameter of the radially flanged portion 111a of the element 111. The turret plate 91 is provided with a threaded aperture 95 into which the extreme threaded end of the screw 110 is adapted to be screw-threaded. The handle plate 128 is provided with a circular aperture 128b whose diameter is such as to loosely receive the tubular flange 111b of the element 111 and also the underside of the turret plate 91 is provided with a shallow recess 91b which is concentric with, and of greater diameter than, the threaded aperture 95.

To assemble the two relatively superposed plates 91 and 128 at the upper side of the frame-plate 3 so as to facilitate swinging movement of each or both of said plates about the axis 92, the stem of the screw 110 is projected upwardly through the bore of the element 111 which in turn is disposed with its radial flange 111a below the plate 3 and covering the elongated aperture 3a and said tubular flange passing through the aperture 128d of the handle plate 128 to project the upper end of said tubular flange into the shallow recess 91b of the turret plate 91 and the extreme end of said screw being tightly screw-threaded into the threaded aperture 95 of the said turret plate.

The length of the tubular flange 111b of the screw 110 is such that the plate 91 is vertically interspaced from the frame-plate 3 a pre-determined distance in order to permit free swinging movement of the intermediate handle plate 128 on the said axis 92.

Since the major axis of the elongated aperture 3a is substantially in excess of the diameter of the tubular flange 111b of the element 111, while the minor axis of said aperture is very slightly in excess of the diameter of said tubular flange, the assembly of said screw 110 and said element 111, which afford a swinging axis for the two plates 91 and 128, said relatively assembled screw and element 111 are laterally shiftable in the opposite directions of extent of said major axis whereby the swinging axis of said plates is correspondingly laterally shiftable.

Detent means for ensuring definite operative positions of adjustment of the turret plate 91 and also of the handle plate 128 are herein provided, being in the form of a swingable detent lever 144, pivoted by a rivet element 142 having a lowermost enlarged flat head 143 and a rivet head at its upper end 141, and said lever having an upwardly extending detent pin 144b secured by its lower end to an intermediate portion of said lever 144.

The pin 144b is so disposed as to extend upwardly through a relatively larger circular aperture 139 of the frame-plate 3, to facilitate swinging movements of said lever, to the free end 138 of which, at 137, one end of a helical tension spring 136 is secured, the outer end of said spring being anchored to a post 135 extending downwardly from the supporting plate 3.

Figure 15:
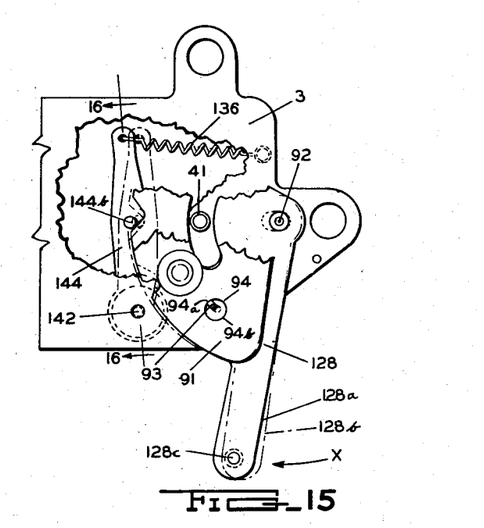
Fig. 15 shows in plan view, a pair of superposed adjustment lever plates comprising an uppermost turret plate and therebelow the lever of Fig. 14 in assembled relation upon a fragment of the common mounting plate for the mechanism of said second embodiment, certain of the parts being shown as broken away to show portions of the other downwardly disposed parts.
Figure 16:
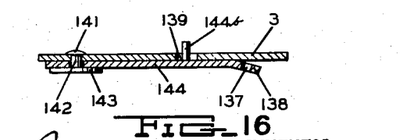
Fig. 16 is a cross-sectional view on the line D—D of Fig. 15 showing in vertical cross-section an indexing pawl lever and a fragment of the supporting plate of the mechanism upon the lower side of which said lever is journalled to swing, and through an aperture of which an upwardly projecting pawl element, also shown in Fig. 15, extends.
Figure 17:
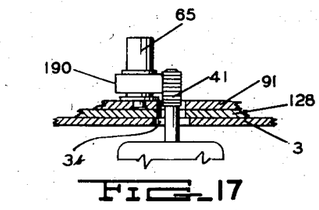
Fig. 17 is a vertical cross-section taken on a line of section E—E of Fig. 8.
Figure 18:
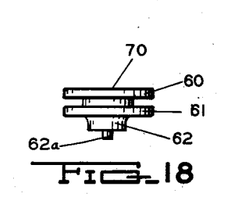
Fig. 18 is a side elevational view of a stationary mount for a wheel carrier element which is fixedly secured to the frame-plate upon which all parts of the drive mechanism are mounted.

Said spring exerts a resilient effort tending to move the free end of said lever 144 from the solid line position shown in Fig. 15 to the dotted line position thereof, and in order to achieve said dotted line position, the detent pin 144b must have entered one or the other of three relatively arcuately interspaced detent notches 124 of the handle element 128 and also must have entered a correspondingly disposed one of the three correspondingly arcuately disposed and correspondingly interspaced notches of the turret plate 91.

From the foregoing description of the swingable detent lever 144 pivoted at 142 and being resiliently and yieldably constrained by a spring 136 to cause the detent projection 144b of said lever to engage, and laterally exert pressure against, both of the superposed plates 91 and 128, the effect of such spring pressure tends to move the relatively assembled plates 91 and 128 and the elements affording the swinging axis 92 therefor in such a direction as to move the tubular flange 111b of the element 111 in the direction of the major axis of said elongated aperture 2a of the plate 3 as will tend to cause said tubular flange of the element 111 to approach that one of the arcuate ends of said aperture, which is more remote from the detent pin 144b of the lever 144; the last described effect of the spring pressure exerted by the spring 136, is for the purpose of resiliently, but yieldably, urging any operatively positioned idler pulley in such a lateral direction as to maintain the periphery of the lower pulley portion 199 of any such pulley in peripheral pressure engagement with the lateral peripheral surface of the drive pulley 41, and whereby the common turret support 91 for all said idler pulleys may be shifted laterally against the pressure of said spring 136 when any said lower pulley portion 190 is adjustably moved into peripheral engagement with the lateral surface of said drive pulley. Therefore, any lower pulley portion 190 of any operatively positioned one of said idler pulleys, engages said drive pulley with a substantially constant contact pressure which is substantially less than would be required if it were attempted to dispense with spring pressure as a means of ensuring driving engagement between said drive pulley and the lower idler pulley portion.

It may be further stated that the presently disclosed drive mechanism employing processionally movable pulleys each selectively adapted for peripheral engagement with the drive pulley 41, is commercially successful largely because of the utilization of spring pressure to yieldably maintain a desired degree of pressure engagement between the drive pulley and the lower idler pulley portion, since in quantity production commercial tolerances must be greater than can be otherwise employed.

Figure 8:
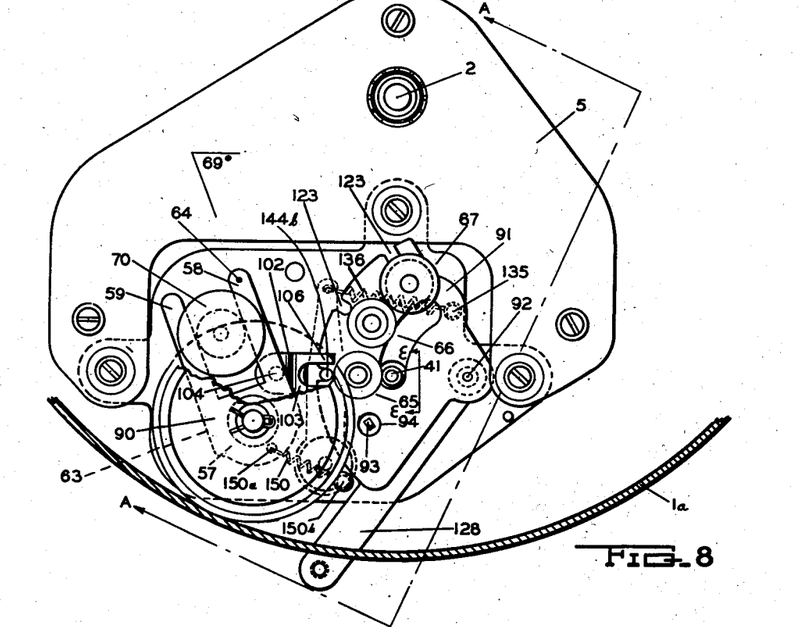
Fig. 8 illustrates in top plan view a second embodiment of my invention shown as applied to the driving of a phonographic turntable at a minimum speed, the view being otherwise of the same general character as that of Fig. 1.

The degree of pressure engagement between the idler wheel and the upper pulley portion of any operatively positioned idler pulleys is ensured in the present embodiment of my invention by the floating nature of the support for the idler wheel and the presence of a biasing spring at 15, Figs. 1 to 7 and 150 in Figs. 8, et seq.

A spring 150, its two ends respectively connected to the slide at 150a and to a pin 150b, the latter carried by the frame plate 3, biases the wheel toward its operative position in the manner previously described for the spring 15 of the first said embodiment.

Both of the plates are provided with corresponding relatively superposed arcuately directed openings 108 and 109 respectively for the plates 128 and 91, and for the purpose, and in the manner, previously described for the arcuate opening 48 of the handle plate 26 of the first described embodiment, said openings being closely in vertical alignment at all times to provide a vertical passage for the motor shaft 40 and its upwardly disposed pulley portion 41, the motor M being carried by the common supporting frame-plate 3 in the manner previously described for said first embodiment.

Figure 19:
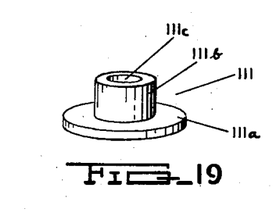
Fig. 19 is a perspective view of an element employed in interconnecting a controlling and a controlled lever plate with the main frame of the mechanism and for affording a swinging axis for said lever plate.
Figure 20:
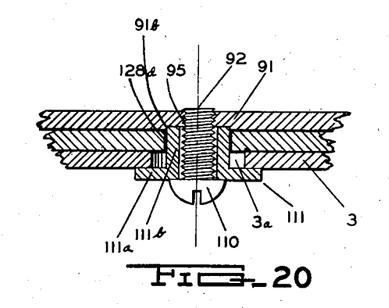
Fig. 20 is a view in transverse vertical section of the interconnecting means referred to in connection with Fig. 19.
Figure 21:
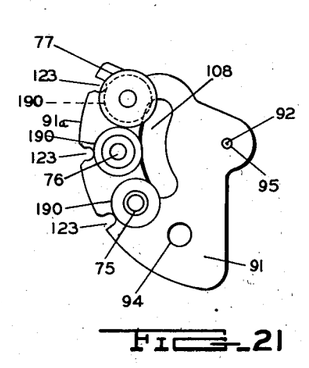
Fig. 21 is a plan view of an idler pulley carrying turret plate.
Figure 22:
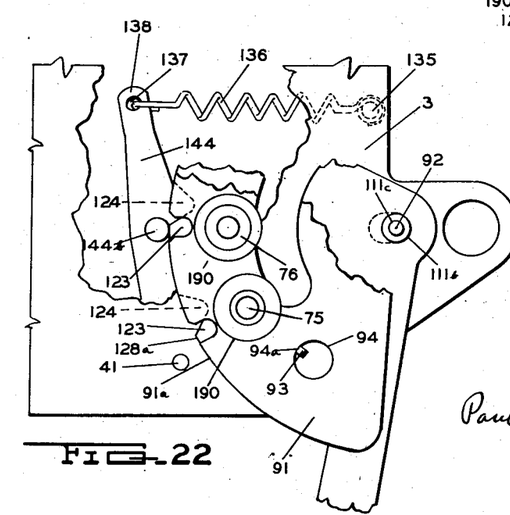
Fig. 22 is a top plan view of the assembly of the turret plate lever of Fig. 21 with an actuating handle plate lever and other ancillary parts, portions of the illustrated parts being broken away to expose other parts located therebelow.

The two superposed relatively actuating plate 128 and actuated turret plate 91 being both journalled for swinging adjustment movement on the tubular flange 111b, Fig. 19, of the assembly illustrated in Fig. 20, are prevented from vertical operating movement at a portion of their marginal edges with respect to the swinging axis 92 from the drive pulley 41 by the provision of a bifurcated end portion 103 of a vertically stepped sheet metal part 102, the lowermost end thereof being secured to the upper side of the frame plate 3 by a screw 104 and the relatively elevated forks 106 overhanging the border portion of the said superposed plates which is laterally aligned with the axis of swinging, the axis of the pulley 41, and the axis of any operatively positioned idler pulley.

The detent pin 144b which is adapted to be laterally reciprocated during adjustment movements of the plates 128 and 91, is disposed between said forks 106 of said retaining member 102. The part 102 has no other function than to engage by the lower surfaces of its said forks, the uppermost surface of the uppermost adjustment plate 91 to prevent up-tilting of said plates whose relatively opposing surfaces are preferably in face to face engagement.

The idler pulleys and any other parts of the mechanism which are the second embodiment of my invention, are constructed and operate in the manner substantially as will be understood from the description of the corresponding parts of the said first embodiment.

With respect to the detent notches 123 of the uppermost turret plate and the correspondingly located notches 124 of the lowermost handle plate 128, the notches 124 are each provided with relatively more divergent side edge portions than are the notches 123 of the turret plate although the differently formed notches for said different plates are of substantially the same depth. Therefore, the notches 124 are substantially wider in their portions nearest the arcuately formed border edge 128a of the plate 128 than are the corresponding outermost portions of the notches 123 whose sides are more nearly parallel with each other. By virtue of this dissimilarity in the width of the outermost portions of the notches of the two plates, when the turret plate is adjustably swung as a result of an adjustment swinging movement of the handle plate 128 whenever during such movement any of the idler pulleys closely approach their finally adjusted operative position, the detent pin 144b which is carried on the lever 144, cannot enter any of the notches 124 until the pin 144b is directly in alignment with the relatively narrow entrance to one of the notches 123, of the turret plate, and until this occurs, the upward projection 93 of the handle plate 128 is tractively engaged with that inner edge portion of the circular opening 94 of the turret plate 91 which is disposed in the path of adjustment movement of said projection 93; in other words, the projection 93 engages that portion of the inner edge of the circular opening 94 which is indicated at 94a, Fig. 15, whenever the turret is adjustably moved by the handle plate member 128 when its handle end 128c is being moved in the clockwise direction indicated by the arrow at x, Fig. 15, and whenever the adjustment movement is proceeding in the direction opposite to that indicated by the arrow x, Fig. 15, the point of engagement between said projection 93 will be at 94b, Fig. 15, until the detent pin 144b is snapped into a notch 123.

Figure 9:
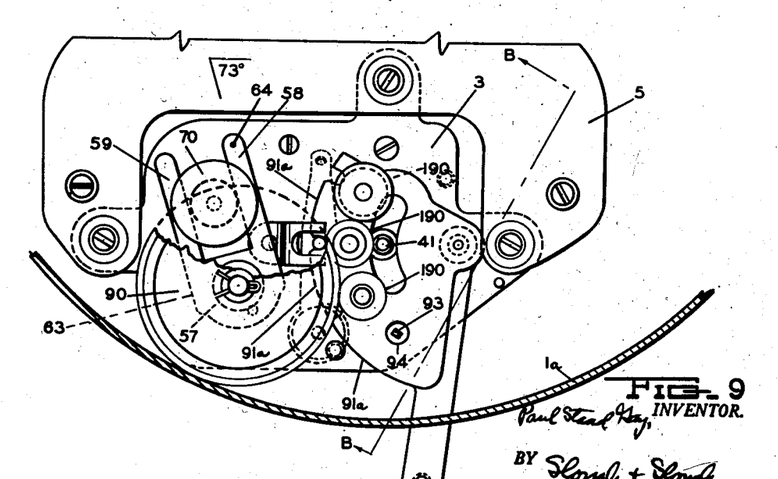
Fig. 9 is a view similar to that of Fig. 8 but showing the parts relatively adjusted to effect driving of the turntable at a selected intermediate speed.
Figure 10:
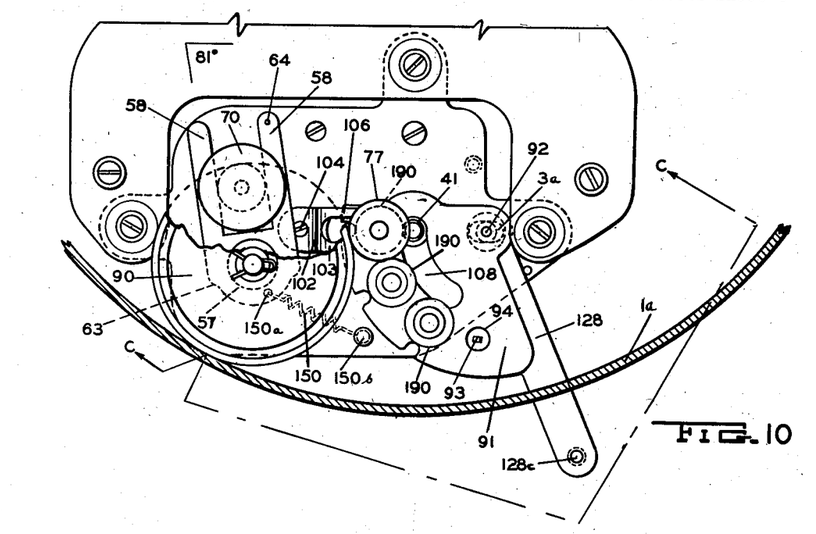
Fig. 10 is a view similar to that of Fig. 8 showing the parts relatively adjusted to effect driving of the turntable at a selected maximum speed.

As soon as the spring 136 snaps the pin 144b into one of the narrower notches 123, said pin will engage one of the sides of the notches 124 which sides are more divergent than those of the notches 123; and therefore, when the pin 144b is snapped inwardly by the spring 136, the pin will make camming engagement with one of the more divergent sides of the notch 124 to enter said notch with the relatively superposed notch 123 of the turret plate, and with the further result that the upward projection 93 of the handle plate will be snapped back to the mid-position within the circular opening 94 of the turret plate 91 as illustrated in Figs. 8, 9 and 10. The snapping of the pin 144b into the dual notches of the two plates with a striking blow by said pin against the bottoms of said notches to lock said plates against rotation of their interlocked notch portions, which thus are radially aligned with the pin 144b, produces a distinct, audible "click" so that an operator adjusting the apparatus from one driving speed to another is audibly apprised of the fact, and moreover, is apprised of the fact when the adjustment movement of the handle plate 128 is from one extreme to an opposite extreme adjustment position since the movement of the spring pressed pin into the intermediate pair of superposed notches momentarily retards the adjustment movement to a degree which makes the retardation noticeable.

After said interlocking of the plates 128 and 91, said pin 144b is outwardly displaceable in response to rotative movement of the handle plate 128 during the initial period thereof while the projection 93 is moving towards engagement with one of the opposite edges of the aperture 94 of the plate 91, since during that period, one or the other of the more obtusely inclined side edges of the then pin containing notches 124 of the handle plate, makes camming engagement with same to move it radially outward beyond the radial extent of the relatively superposed notches 123 of the plate 91.

As previously stated, the spring pressed lever 144 through the pin 144b, creates a pressure effort upon the plates 128 and 91 which is directed from said pin along a line which includes the swinging axis 92 of the plates 128 and 91, and this pressure tends to move said plates horizontally whether the pin 144b is riding upon the arcuate edge portions of the plates or when said pin is in interlocking engagement with the inner end edge portion of any of said notches.

When said plates are being adjustably swung to position any lower pulley portion 190 of any said idler pulley in its operative position wherein it engages the lateral surface of the drive pulley 41, the said pulley is moved laterally as a result of camming peripheral engagement of said lower pulley portion with the stationary relatively immovable drive pulley 41, such lateral movement being also imposed upon the two plates and is yieldably opposed by said spring 136 acting through the lever 144.

Therefore, although the lateral spacing between the swinging axis 92 of said plates and the axes of said idler pulleys is always the same throughout all adjustment movements, means are here provided which operate to permit both said plates and their swinging journal 111b, to be unitarily moved in opposite horizontal directions, which directions of horizontal movement are aligned with the major axis of elongated opening and are transverse with respect to the direction of adjustment movement of said idler pulleys.

The spring 138 therefor permits the lower pulley portions 190 of the idler pulleys to ride over the said drive pulley 41 but ensures such a pulley portion will peripherally engage said drive pulley with such a definite degree of pressure engagement which is communicated to the operatively adjusted one of said idler pulleys 65, 66 or 67 by said spring.

Such pressure engagement is supplemented to some extent by the pressure of the spring 150 which maintains the periphery of the friction wheel 70 in pressure engagement with the upper pulley portion of an operatively positioned idler pulley, said spring 150 being preferably a much lighter spring than the spring 138, the latter exerting an increased force since it operates through a lever 144, which is a lever of the second class.

With respect to the first described embodiment of my invention which is illustrated in Figs. 1 to 7 herein, my present application is a continuation of my previously filed and presently co-pending application, Serial No. 83,665, filed March 26, 1949.

It will be noted that in both embodiments of my invention the means for selectively pre-determining the speed at which the turntable shall be rotated comprises a handle which is adjustably movable in a path of uniform directional nature throughout and in the forms shown said path tends arcuately being the path of a pivoted handle and the operator, therefore, is not required to move said handle in a path, the direction of adjustment movement being abruptly changed at intermediate portions of said path, as previously proposed for prior plural speed mechanisms.

Having described two embodiments of my invention, whereof the second described embodiment is at present preferred by me, I am aware that numerous and extensive departures may be made from the embodiments herein illustrated and described but which come within the purview of my invention as distinguished from prior mechanisms and I therefore claim as my invention:

1. In a frictional drive mechanism for a phonograph record supporting turntable of the type which is characterized by the turntable having a pendant annular flange adapted for lateral frictional engagement by a friction wheel of the mechanism, comprising in combination, a frame for unitarily supporting all parts of the mechanism, said parts comprising a motor and an upwardly extending drive shaft therefor, said shaft affording an upwardly located drive pulley, a friction final drive wheel having a rim of frictional material which is substantially sound-insulating, a laterally movable mount affording a journal adapting said wheel for rotation upon a vertical axis, at least three idler pulleys each having a pair of co-axial relatively superposed upper and lower pulley portions, and the ratio of diameters of said pair of pulley portions for different of said pulleys, being different, a common carrier affording separate laterally interspaced journals for each said idler pulley, said idler pulleys being thereby adapted for rotation upon relatively parallel interspaced vertical axes on said carrier, which is adjustably movable to processionally move said pulleys to successively different positions which are interspaced at intervals in a single path of pulley movements, said path being of like directional nature throughout, and one such position of said path being a common operating position for said pulleys, wherein the respective upper and lower portions of an operatively positioned pulley are respectively disposed in peripheral engagement with said wheel rim and said drive shaft pulley respectively, spring means operative to resiliently and yieldably, dispose and maintain said lower and upper pulley portions of any such operatively adjusted pulley in peripheral spring-pressed engagement respectively with the peripheries of said shaft pulley and of said wheel, said path of processional pulley movements extending longitudinally between opposite terminal portions disposed in interspaced relation to a vertical plane which includes the axes of said wheel and of said drive pulley, and the intermediate portion of said path being in intersecting relation to that portion of said plane which is interposed between said wheel and drive pulley axes, and said operative pulley position being located substantially closely to said intersection of said path and said plane.

2. In a frictional drive mechanism for a phonograph turntable of the type having a pendant annular flange affording an inwardly laterally facing annular surface which is adapted for frictional driving engagement by the periphery of a driving friction wheel, the combination with a mounting plate carrying all parts of the mechanism, said parts comprising a friction driving wheel, an electric motor and a drive pulley rotatably driven thereby, the peripheries of said drive pulley and of said wheel being at different levels, a plurality comprising at least three idler pulleys, a common laterally adjustable mount for all said idler pulleys, a laterally movable mount for said wheel, said wheel and all of said pulleys being rotatable on relatively parallel, and laterally interspaced vertical axes, each of said idler pulleys having a pair of co-axial, relatively superposed lower and upper pulley portions, the said lower pulley portions thereof being disposed at the level of the peripheral surface of said drive pulley and the upper of said pulley portions being disposed at the level of the periphery of said wheel, speed selecting means comprising an adjustable member movable to laterally move said pulley mount to different positions to effect processional movements of said idler pulleys in a continuous path of movement which is of directionally like nature, to selectively so dispose any desired one of said idler pulleys in a single operative position wherein peripheral engagement of its said lower pulley portion is effected with said drive pulley and wherein peripheral engagement between its said upper pulley portion and the periphery of said wheel is concurrently achieved, at least those pulley portions of different of said idler pulleys which are at a common one of said levels being of such diameters that when different of said pulleys are frictionally driven by said drive pulley, said wheel will be caused to rotate at different rotational rates, the peripheral portions of said lower pulley portions and of said wheel being of resilient, cushioning friction material which is substantially resistant to the transmission of tonal vibrations, spring means adapted to directionally resiliently exert pressure upon each of said mounts, said spring means adapted to yieldably maintain said lower and upper pulley portions of any selected one of said pulleys which is adjusted to said operative position, respectively in yieldable spring-pressed engagement with said peripheral surface of said drive pulley and with said wheel, and said wheel having a portion of its peripheral surface so laterally disposed with reference to said parts of the mechanism as to permit such positioning of said mounting plate as to effect peripheral engagement of said wheel with said inwardly facing surface of the pendant flange of a turntable for driving said turntable, and said path for processional pulley movements extending between terminal points at opposite sides of a vertical plane which includes the rotational axes of said wheel and said drive pulley and said path intersecting said plane at a portion disposed between the peripheral surfaces of said wheel and drive pulley.

3. A plural-speed drive mechanism for phonograph turntable of the general type characterized by the provision of a pendant annular flange, comprising a mounting plate to which all parts of the mechanism are unitarily secured, said parts comprising a motor having a driving shaft affording an upwardly extending drive pulley portion rotatable on a vertical axis, a laterally shiftable drive wheel having a friction rim, a laterally adjustable lever pivotally connected at a first portion thereof to said plate and having another relatively laterally interspaced carrier portion, at least three pulley elements separately journalled for rotation on vertical axes in laterally interspaced positions upon said carrier portion with their axes disposed equidistantly from said first pivoted portion, each said element having an upper and a lower pulley portion with all of the set of upper portions being at a common level at which the wheel rim is disposed, and all of the set of lower portions being disposed at a common relatively lower level of said drive pulley portion, said lever adapted for swinging movement to any of three successively disposed lateral positions to processionally move said elements in such a path of uniform directional nature that said upper and lower pulley portions of each successively disposed of said elements, are successively disposable in an operative position of peripheral engagement respectively with said wheel rim and with the pulley portion of said shaft, a horizontally movable mount member affording a journal upon which said wheel is rotatable about a vertical axis, spring means adapted to exert a constant effort upon said wheel mount tending to yieldably maintain the wheel rim in peripheral engagement with the upper pulley portion of any said operatively positioned element, and said spring means comprising means adapted to yieldably maintain the lower pulley portion of said operatively adjusted element in peripheral engagement with the pulley portion of said shaft, the ratio of diameters of the pulley portions for each pulley being different from that of other of said pulleys, and a portion of the periphery of said wheel, which is circumferentially substantially interspaced from that portion thereof which is engageable with said upper pulley element portion, being adapted for driving engagement with the inwardly facing annularly concave surface of said pendant flange of a turntable in response to positioning of said mounting plate with respect to said turntable, said path of processional pulley movements extending lengthwise between opposite terminal portions disposed in interspaced relation to a vertical plane which includes the axes of said wheel and of said drive pulley, and the intermediate portion of said path being in intersecting relation to that portion of said plane which is interposed between said wheel and drive pulley axes, and said operative pulley position being located substantially closely to said intersection of said path and said plane.

4. In a unitary plural-speed friction drive mechanism adapted to drive a phonograph turntable at any selected one of a plurality of different rotational speeds comprising a frame, a final drive friction wheel disposable in peripheral friction engagement with the inner annular surface of a pendant turntable flange, a motor, a vertical rotatable drive shaft for said motor comprising a friction drive pulley, the periphery of said wheel being disposed at a higher level than that of said drive pulley, a laterally adjustable idler pulley carrier, a plurality comprising not less than three laterally interspaced idler friction pulleys, each being independently journalled for rotation about a vertical axis on said carrier, a horizontally movable wheel mount on which said friction wheel is journalled for rotation about a vertical axis, said motor, said mount and said carrier being supported by said frame, a laterally movable adjustment member, said carrier being laterally adjustably movable in response to adjustment movements of said member, to effect concurrent processional movements of all said pulleys in a common path of movement which is directionally of substantially uniform nature throughout its length, and a medial portion of which path being disposed in intersecting relation to a portion of a vertical plane which is disposed between the vertical axes of said wheel and drive pulley, said vertical plane including said wheel and drive pulley axes, whereby any of said idler pulleys may be selectively disposed at a common operative position in the region of intersection of said path and plane whereat any one of said pulleys, selected by positioning said member in a particular one of a plurality of adjustment positions, is laterally interposed between said drive shaft pulley and the periphery of said wheel, each of said pulleys comprising one of a set of lowermost pulley portions and also one of a set of upper pulley portions, the lower set of pulley portions being disposed at the level of said drive pulley and those of the other set being disposed at the level of the periphery of said wheel, whereby said wheel periphery and said drive pulley may be respectively engaged by an upper and a lower of said pulley portions of an operatively positioned selected idler pulley, the different pulley portions of one of said sets being of respectively differing diameters, and spring means for resiliently and yieldably maintaining such respective engagement with said wheel and with said drive pulley, of the respective upper and lower pulley portions of any said operatively positioned idler pulley.

5. In a drive mechanism for a phonograph turntable of the type having a pendant annular flange, the combination with a frame plate supporting all parts of the mechanism, said parts comprising an electric motor, a drive pulley rotated by said motor, at least three idler pulleys, and a final drive wheel, said drive pulley being disposed at a lower level than the periphery of said wheel, said drive pulley, wheel, and idler pulleys, being each rotatable on a different vertical axis, each of said pulleys having a pair of axially aligned upper and lower pulley portions which are respectively disposed at the level of the periphery of said wheel and at the level of said drive pulley, a laterally adjustable support upon which said idler pulleys are journalled in successively laterally interspaced relation, a laterally movable mount for said wheel, the said upper and lower pulley portions in the case of different of said idler pulleys having diameters which are respectively in different ratios, an adjustment member laterally movable, in a path of movement which is directionally of uniform nature throughout, to any selected one of three interspaced stations in said path, said idler pulley support being adjustably movable, in response to station-to-station movements of said member, to variantly so move said idler pulleys processionally to selectively position any one of said idler pulleys in a single common operative position, spring means resiliently and yieldably maintaining frictional driving engagement between said drive pulley and the said lower pulley portion of an operatively disposed idler pulley, further spring means exerting a biasing, laterally directed pressure effort on said wheel mount to effect and maintain frictional driving engagement between the periphery of said wheel and the said upper pulley portion of any operatively positioned pulley, and said wheel being of substantially greater diameter than any of said upper pulley portions, and said processional pulley movements being in a path of movement laterally between substantially widely interspaced terminal points located at opposite sides of a vertical plane which includes the axes of rotation of said wheel and said drive pulley, and said path of processional movement being intermediately in intersecting relation to a portion of said plane which is located between said axes.

6. The friction drive mechanism substantially as set forth in claim 4 characterized by said carrier being in the form of a plate horizontally adjustably swingable about an axial portion of the plate and said idler pulleys being arranged arcuately in laterally interspaced relation to each other, and each thereof being equi-distant from said swinging axis, and said carrier plate when swung adapted to processionally move said idler pulleys in a substantially arcuate path of movement to adjustably dispose any of said idler pulleys in engagement with said drive pulley at a side thereof which is remote from the swinging axis of the carrier, and said plate having a portion cut away at that side of the idler pulleys which is disposed toward said swinging axis, said motor shaft being projected upwardly through said cut away portion.

7. The friction drive mechanism substantially as set forth in claim 4 characterized by said carrier and said manually operable means being loosely interlocked so that the carrier may be tractively moved by adjustment movements manually imparted to said manually operable means, and also by the provision of detent and notch means a different one thereof being respectively associated with said carrier and said frame, one of said means being movable responsive to, and commensurable with, movements of said carrier, and wherein said detent and notch means are yieldably maintained in interlocked relation, responsive to any adjustment movement of said carrier which has become effective to place any of said wheel pulleys in the recited operative position.

8. The drive mechanism substantially as set forth in claim 5 characterized by said idler pulley support being in the form of a lever plate and being journalled for lateral swinging movement about a portion thereof which is substantially equidistant from the axis of rotation of each of said idler pulleys, and said actuating member adapted to swing said lever plate to dispose any of said idler pulleys in its recited operative position.

9. The drive mechanism substantially as set forth in claim 5 characterized by the provision of spring pressed indexing means adapted to yieldably arrest movement of said idler pulley support responsive to positioning of any of said idler pulleys in the recited operative position.

10. A plural-speed friction drive mechanism for driving a phonograph turntable of the type having an annular flange, comprising a friction wheel having a tread of rubber or like material, a laterally movable mount affording a journal on which said wheel may rotate on a vertical axis, a plurality of friction pulley elements, a rotatable motor shaft having a pulley portion disposed at a lower level than said wheel tread, said elements each provided with relatively upper and lower coaxial pulley portions which in the case of different of said elements are in diametrically different ratios to each other, and which upper and lower portions are respectively disposed at the respective levels of said wheel tread and said shaft portion, a common mount upon which said elements are journaled in laterally interspaced relation, said common mount adapted for movement to different adjustment positions in respective of which a different of said elements is disposed in an operative position wherein its said upper portion is frictionally engaged with said wheel tread, and wherein its said lower portion is frictionally engaged with said shaft pulley portion, a frame upon which said shaft, wheel and elements are secured in unitary relation, said wheel being so disposed on said frame that said frame may be so disposed with reference to a phonograph turntable as to place the wheel tread in driving engagement with a lateral surface of an annular flange of a turntable, and spring means exerting resilient laterally directed efforts on said mounts, to resiliently maintain the respective portions of an operatively positioned element in concurrent frictional engagement with said wheel tread and with said shaft portion respectively, and to resiliently resist displacement of said wheel tread from engagement with an associated turntable flange, said common mount being swingable about an axial portion thereof, said pulley elements being disposed in relatively equidistant relation to said axial portion, and being processionally movable, in response to swinging movements of said mount about said axial portion, in an arcuate path of adjustment movement, and said shaft pulley portion being adjacently disposed at that side of a medial portion of said path which is nearest said axial portion of said mount.

11. A plural-speed friction drive mechanism for phonograph turntables of the type having a pendant annular flange, a vertically extending motor drive shaft affording a pulley portion disposed at a first level, a wheel having a cushion friction thread disposed at a higher second level, a laterally movable mount upon which said wheel is journalled for rotation about a vertical axis, a lever having an actuator portion adapted to be oppositely laterally swung in an arcuate path of movement to any of a plurality of stations in said path, a laterally movable carrier, a plurality of idler pulley elements, each separately journalled in relatively interspaced relation to each other on said carrier, each of said elements having an upper and a lower pulley portion the diametrical ratio between which being different in the case of different of said elements, said portions being respectively disposed at said second and said first levels, said carrier being laterally movable in response to successive station-to-station movements of said lever in the same direction to processionally move said pulley elements to effect sequential operative engagement concurrently by the respective upper and lower portions of each with said wheel tread and said shaft portion, spring means adapted to resiliently yieldably maintain such operative engagement with respect to the said portions of any such engaged one of said elements, and a frame to which said shaft, wheel mount, carrier and lever are secured in unitary relation, said wheel tread so disposed as to be engageable with a lateral surface of a turntable flange to drive the turntable, said carrier being swingably movable by said lever, about an axial portion thereof, said pulley elements being disposed in relatively equidistant relation to said axial portion, and the said drive shaft being adjacently disposed at that side of a medial portion of the path of processional movement of said elements which is nearest the said axial portion of said carrier.

12. A plural-speed friction drive mechanism for driving a phonograph turntable, having an annular flange, at different speeds, comprising a vertical motor shaft having an upper pulley portion, a final drive wheel having a friction tread which is disposed at a higher level than said shaft pulley portion, and being adapted to be peripherally engaged with a flange of a turntable, a laterally movable mount affording a journal upon which said wheel is rotatable about a vertical axis, a laterally adjustable pulley carrier, a plurality of idler pulley elements journalled in interspaced relation on said carrier for rotation, each on a vertical axis, each of said idler elements having relatively upper and lower pulley portions, the relative diameters of the said pulley portions of different of said idler elements being substantially different, said upper and lower idler element portions being respectively disposed at the level of said wheel tread and at the level of said shaft pulley portion, spring means biasing said wheel mount to yieldably force said wheel tread toward said elements, and said carrier being adjustably movable to different successive stations in a path of movement to dispose different of said elements in an operative position in response to positioning of said carrier at the different stations, and each said operatively positioned element being in engagement by its upper portion with said wheel tread, and by its lower portion with said shaft pulley portion, said carrier being rotatable about an axial portion thereof, said elements being disposed concentrically with respect to said axial portion, and said elements being processionally movable, in response to rotational movement of said carrier, in a path of movement disposed adjacently laterally beyond said shaft pulley portion with respect to the carrier axis, said path being concentric with said axial portion of the carrier.

13. The transmission mechanism for driving phonograph turntables of the pendant tubular flanged type, comprising a friction wheel, a plurality of pulleys, and a motor shaft affording a pulley surface, said wheel, said pulleys, and said shaft journalled to rotate on vertical axes, said wheel being disposable in peripheral frictional engagement with an inner surface of a turntable flange, each of said pulleys having an upper and a relatively co-axial lower pulley portion, adapted to be interchangeably selectively interposed between, and in concurrent peripheral engagement by its respective upper and lower portions, with said wheel and said shaft pulley surface, the relative diameters of the said upper and lower pulley portion for different of said pulleys being in different ratios, and manually operable adjustment means adapted for differing adjustment movements, to selectively position any of said pulleys in its operative position wherein its said upper and lower pulley portion is frictionally engaged respectively with the periphery of said wheel, and with the pulley surface of said shaft, said pulleys being adjustably processionally movable in an arcuate path of movement, all of whose portions being relatively concentric, and said shaft having its portion affording a pulley surface being disposed adjacent to the concave side of said path of movement which is disposed nearest the center of concentricity of said path.

14. A plural-speed friction drive mechanism for peripherally flanged phonograph turntables, comprising a final drive wheel having a friction tread adapted for engagement with a turntable flange, a laterally movable mount affording an upstanding journal post for said wheel, a spring so located and so applied to said wheel mount as to tend to retractively roll the wheel tread on an engaged turntable flange, a laterally shiftable support and a plurality of laterally interspaced upstanding journal posts thereon, a vertical motor shaft having a pulley portion disposed at a lower level than the level of said wheel tread, a plurality of pulley elements, each having an upper and a lower pulley portion, different of said elements journalled on different posts of said support, the ratio of diameters of the respective upper and lower portions in the case of different of said elements, being different, said support being adjustably laterally movable in either of two opposite directions to different adjustment positions to selectively dispose any of said elements in an operative position whereby its lower pulley portion is frictionally engaged with said shaft portion, and whereby concurrently an upper pulley portion thereof is frictionally engaged with said wheel tread, and a second spring associated with said pulley support and yieldably urging said support in a direction lateral to its direction of movement to resiliently maintain the said lower pulley portion of an operatively positioned pulley element in frictional engagement with said shaft pulley portion, and said wheel tread being concurrently resiliently maintained in engagement with the upper pulley portion of the same element, said support being in the form of a lever adjustably swingable about an axial portion and having a swingably movable portion on which said elements are journalled with their axes disposed in equidistant relation to said axial portion of the lever, said elements being processionally movable in response to swinging adjustment movements of said lever support in an arcuate path of movement whose medial portion is disposed adjacently beyond said shaft pulley portion, with respect to said axial portion of said support.

15. A selective plural speed friction drive mechanism for phonograph turntables having an annular flange, comprising a vertical motor shaft affording a pulley end portion, a plurality of relatively laterally disposed friction drive pulley elements, movable mount means adapting said elements for lateral shifting movement, a wheel having a friction tread and a movable mount therefor adapting it for lateral movements, said wheel being so disposable as to effect engagement of its tread with a phonograph turntable flange, each of said elements having an upper and a lower pulley portion which are respectively disposed at the levels of said tread and said shaft portion, the ratio of relative diameters of said pulley portions, in the case of different of said elements, being substantially different, adjustment means having an actuating member adapted to be adjustably moved from and to, different relatively interspaced stations located in a path of movement which is of like directional nature throughout said mount means for said elements being so laterally movable, in response to station-to-station adjustment movements of said actuating member, as to effect disengagement from said wheel tread and from said shaft portion, of the upper and lower pulley portions, respectively, of any one of said elements whose said portions have been, respectively, previously engaged therewith, and in response to the same adjustment movement of said member, said mount means being so disposed as to effect engagement of the respective upper and lower pulley portions of another of said elements with said wheel tread and said shaft pulley portion respectively, spring means adapted to yieldably apply a laterally directed resilient effort tending to maintain said wheel tread in engagement with an upper pulley portion of an operatively positioned one of said elements, and concurrently adapted to yieldably oppose lateral displacement of said wheel, by the effect of the engagement of its tread with any thereby engaged turntable flange, and said mount means comprising a support rotatable about an axial portion thereof, and said elements being so disposed in relatively interspaced relation, on a portion of the support which is swingable about said axial portion, as to be relatively equidistant therefrom, and said elements being processionally movable in a path of movement whose medial portion is located adjacently beyond said end portion of said shaft with respect to the said axial portion of said mount means support.

16. A plural-speed friction drive mechanism for driving a phonograph turntable of the type having an annular flange, comprising a friction wheel having a tread of rubber or like material, a laterally movable mount affording a journal on which said wheel may rotate on a vertical axis, a plurality of friction pulley elements, a rotatable motor shaft having a pulley portion disposed at a lower level than said wheel tread, said elements each provided with relatively upper and lower co-axial pulley portions which in the case of different of said elements are in diametrically different ratios to each other, and which upper and lower portions are respectively disposed at the respective levels of said wheel tread and said shaft portion, a common mount upon which said elements are journalled in laterally interspaced relation, said common mount adapted for movement differently of a plurality of adjustment positions in respective of which a different of said elements is disposed in an operative position wherein its said upper portion is frictionally engaged with said wheel tread, and wherein its said lower portion is frictionally engaged with said shaft portion, a frame upon which said shaft, wheel and elements are secured in unitary relation, said wheel being so disposed on said frame that said frame may be so disposed with reference to a phonograph turntable as to place the wheel tread in driving engagement with a lateral surface of an annular flange of a turntable, and spring means exerting resilient laterally directed efforts on said mounts, to resiliently maintain the respective portions of an operatively positioned element in concurrent frictional engagement with said wheel tread and with said shaft pulley portion respectively, and to resiliently resist displacement of said wheel tread from engagement with an associated turntable flange, the said common mount for said elements being so movable, and said elements being so successively disposed on said mount in the direction of its movement as to be relatively processionally movable in a path of movement which extends longitudinally from one side to an opposite side of a vertical plane in which the rotational axes of said wheel and of said shaft are located and extending in intersecting relation to a portion of said plane which is disposed between portions of said wheel tread and of said shaft pulley portion which are in most closely laterally interspaced relation.

17. The drive mechanism for phonograph turntables having an annular flange, a wheel having a peripheral friction tread adapted for peripheral engagement with a turntable flange, a laterally movable mount for said wheel, a motor and a vertically extending drive shaft thereof, a plurality of idler pulleys each having upper and lower portions in respectively different diametrical ratios, a pulley end portion of said shaft and said lower portions of said idler pulleys being disposed at a common level which is lower than the common level of said wheel tread and said upper pulley portions, an idler pulley supporting lever journalled by a relatively axial portion and having a relatively swingable portion on which said pulleys are journalled in arcuately interspaced relation, said pulleys being rotatable on separate vertical axes which are relatively equidistant from said axial lever portion and being processionally movable in response to swinging movements of the lever in a path of movement which is concentric with said lever axial portion, said drive shaft pulley end being disposed between a medial portion of said path and said lever axial portion, and adjacent to the radially inner side of the path to cause it to engage the said lower pulley portion of any idler pulley which is disposed in the said medial portion thereof, a spring biasing said wheel by its said mount to position its tread for peripheral engagement with the upper pulley portion of any said idler pulley whose lower portion is engaged with the pulley end portion of said shaft.

18. Plural speed friction drive mechanism for driving a phonograph turntable of the type having an annular flange, comprising a friction wheel having a rubber or like tread, a laterally movable mount on which said wheel is journalled for rotation on a vertical axis, a plurality of idler pulleys each of which having a pair of respectively upper and lower co-axial portions which in the case of different pulleys are in different diametrical ratios, a motor having a vertical shaft whose upper portion affords a drive pulley, said wheel and drive pulley being each disposed to rotate on a vertical axis at the respective levels of said upper and said lower idler pulley portions, a pair of relatively superposed co-axially pivoted levers, a lost-motion interconnecting means for communicating swinging movement from a lower relatively actuating one of said levers to an uppermost relatively actuated one thereof, locking means operable in response to discontinuance of swinging movement of said actuating lever to interlock both of said levers in any one of such a plurality of relatively interspaced positions, which is at least equal to the number of said idler pulleys, said idler pulleys being journalled for rotation about different vertical axes, on relatively laterally interspaced portions of said uppermost relatively actuated lever, said idler pulleys being processionally movable, in response to swinging movements imparted to the said uppermost relatively actuated lever, in an arcuate path of movement in all portions of which said idler pulleys are alike equidistant from the pivotal axis of said levers, said drive pulley being disposed at the side, of an intermediate portion of said path, which is nearest said pivotal axis, and being successively engageable with the said lower portion of successive of said pulleys in response to a complete swinging movement of said actuated lever between opposite extreme positions thereof, and said actuating lever adapted to disable said interlocking means in response to any following swinging movement of the said actuating lever in either direction after interlocking of said levers by said locking means, and spring means exerting a resilient effort on said wheel, to dispose its said tread at that side of said path of idler wheel movement which is opposite to that side at which said drive pulley is disposed and to effect spring-pressed engagement by said tread with an upper portion of any idler pulley whose said lower portion is concurrently engaged with said drive pulley.

19. The drive mechanism substantially as set forth in claim 18 wherein said locking means for said levers comprises correspondingly radially disposed arcuately laterally interspaced, notched portions of both levers, indexing detent means comprising a detent dog positioned adjacently to the path of movement of all said notched portions, and resilient means urging said dog in a direction for projecting it into an associated pair of said notches of respective of said levers, in response to swinging movement of the levers to index said pair of notches to radial alignment with said dog, the notches of the said actuating of said levers having substantially more outwardly divergent side edges and having their extremities more widely interspaced than the associated notches of the said actuated lever, and said lost motion interconnecting means permitting said actuating lever to swingably move to a sufficient degree at the outset of each swinging movement thereof, to swing each of its notched portions to cause said dog to be cammingly engaged by its divergent side edges of its notch wherein said dog is at the time disposed, to cam said dog in the outward direction between the associated notches of the two levers, to release said levers for swinging adjustment movement, prior to the major portion of the swinging movement of said actuating lever, during which swinging movement of the actuating lever is communicated to said actuated lever by the said lost motion interconnecting means.

20. A plural-speed friction drive mechanism for driving a phonograph turntable of the type having an annular flange, comprising a friction wheel having a tread of rubber or like material, a laterally movable mount affording a journal on which said wheel may rotate on a vertical axis, a plurality of idler pulley elements, a rotatable motor drive shaft having a pulley portion disposed at a lower level than said wheel tread, said elements each provided with relatively upper and lower co-axial pulley portions which in the case of different of said elements are in diametrically different ratios to each other, and which upper and lower portions are respectively disposed at the respective levels of said wheel tread and said shaft portion, laterally adjustable mount means upon which said elements are journalled in laterally interspaced relation, said common mount means adapted for movement to any of at least as many adjustment positions as there are idler pulley elements, in different of which positions a different of said elements is so laterally disposed in an operative position wherein its said upper portion is caused to be frictionally peripherally engaged with said wheel tread, and wherein its said lower portion is frictionally peripherally engaged with said shaft portion, said idler pulleys being processionally movable, in response to adjustment movements of said mount means, in a path of movement which is like directional movement throughout its length and which extends from relatively widely interspaced opposite end portions to a medial portion whereat said path is in transverse intersecting relation to that intermediate portion of a vertical plane which includes the axes of said wheel and shaft, and which intermediate portion of said frame is disposed between said wheel tread and said shaft, a frame upon which said shaft, wheel mount, and mount means, are secured in unitary relation, said wheel being so disposed on said frame that said frame may be so disposed with reference to a photograph turntable as to place the wheel tread in driving engagement with a lateral surface the annular flange of such a turntable, and spring means exerting resilient laterally directed efforts on said mount and said mount means, to resiliently maintain the respective said upper and lower portions of an operatively positioned element in concurrent frictional engagement with said wheel tread and with said shaft portion respectively, and to resiliently resist displacement of said wheel tread from engagement with an associated turntable flange.

PAUL STEAD GAY.

REFERENCES CITED

The following references are of record in the file of this patent:

UNITED STATES PATENTS

| Number | Name | Date |
|---|---|---|
| 1,870,421 | Prout | Aug. 4, 1932 |
| 2,200,574 | Davis | May 14, 1940 |

FOREIGN PATENTS

| Number | Country | Date |
|---|---|---|
| 408,973 | Germany | Jan. 27, 1927 |